US007199381B2

(12) United States Patent
Shoji

(10) Patent No.: US 7,199,381 B2
(45) Date of Patent: Apr. 3, 2007

(54) RADIATION IMAGE CONVERSION PANEL

(75) Inventor: Takehiko Shoji, Hachioji (JP)

(73) Assignee: Konica Minolta Medical & Graphic, Inc., Tokyo (JP)

( * ) Notice: Subject to any disclaimer, the term of this patent is extended or adjusted under 35 U.S.C. 154(b) by 91 days.

(21) Appl. No.: 11/053,917

(22) Filed: Feb. 10, 2005

(65) Prior Publication Data

US 2005/0178978 A1 Aug. 18, 2005

(30) Foreign Application Priority Data

Feb. 13, 2004 (JP) ............................. 2004-037077

(51) Int. Cl.
*G03B 42/08* (2006.01)

(52) U.S. Cl. .................................... 250/484.4; 430/139

(58) Field of Classification Search .............. 250/484.4
See application file for complete search history.

(56) References Cited

U.S. PATENT DOCUMENTS

2003/0104245 A1* 6/2003 Bergh et al. ................ 428/690
2003/0189179 A1* 10/2003 Leblans et al. .......... 250/484.4
2003/0222224 A1* 12/2003 Maezawa et al. ........ 250/484.4
2004/0149931 A1* 8/2004 Isoda ...................... 250/484.4
2004/0241395 A1* 12/2004 Jing et al. ................ 428/195.1

* cited by examiner

*Primary Examiner*—Albert Gagliardi
(74) *Attorney, Agent, or Firm*—Finnegan, Henderson, Farabow, Garret & Dunner, L.L.P.

(57) ABSTRACT

A performance of a stimulable phosphor layer is enhanced by filling a filler in spacing of columnar crystals of a stimulable phosphor layer in a radiation image conversion panel having a stimulable phosphor layer in the form of columnar crystals formed by a vapor deposition method. According to the foregoing radiation image conversion panel, entire columnar crystals were able to be evenly surface-treated by penetrating the surface treatment agent into spacing of columnar crystals and by being treated for the surface of columnar crystals with the surface treatment agent in surface tension not more than 25 mN/m, and functions concerning properties such as the prevention of reflection and scattering of a stimulating light, water-repelling, oil-repelling, moisture resistance, antifouling and so forth can also be added.

7 Claims, 1 Drawing Sheet

RADIATION IMAGE CONVERSION PANEL

TECHNICAL FIELD

The present invention relates to a radiation image conversion panel using a stimulable phosphor.

BACKGROUND

A radiation image conversion panel in which a stimulable phosphor layer is provided on a substrate has been developed in order to produce a radiation image obtained without using a silver halide.

A radiation energy depending on a radiation transmittance density on each part of the object can be accumulated through the radiation image conversion panel by irradiating a radiation that has been transmitted through an object to a stimulable phosphor. The radiation energy accumulated in a stimulable phosphor is subsequently emitted as a stimulated luminescence by irradiating the stimulable phosphor with electromagnetic waves (stimulating light) such as visible light and infrared radiation to excite on a time series basis. This signal based on light intensity can be reproduced as a visible image on a recording material such as a silver halide photographic sensitized material and a display apparatus such as CRT by converting this signal into an electric signal by, for example, photoelectric conversion.

It is well known that the superiority or inferiority of the radiation image conversion system using the radiation image conversion panel, is largely controlled by luminance of the stimulated luminescence of the panel and the luminescence uniformity of the panel, and particularly, these characteristics are largely influenced by the characteristic of the stimulable phosphor to be used.

It is described in Patent document 1 that a radiation image conversion panel with high luminance can be obtained by using a stimulable phosphor as expressed in the following formula (1);

$$M^1X.aM^2X'_2.bM^3X''_3:eA \qquad (1)$$

where $M^1$ represents at least one alkali metal selected from the group including Li, Na, K, Rb and Cs; $M^2$ represents at least one divalent metal selected from the group including Be, Mg, Ca, Sr, Ba, Zn, Cd, Cu and Ni; $M^3$ represents at least one trivalent metal selected from the group including Sc, Y, La, Ce, Pr, Nd, Pm, Sm, Eu, Gd, Tb, Dy, Ho, Er, Tm, Yb, Lu, Al, Ga and In; each of X, X' and X" represents at least one halogen selected from the group including F, Cl, Br and I; A represents at least one metal selected from the group including Eu, Tb, In, Ga, Cs, Ce, Tm, Dy, Pr, Ho, Nd, Yb, Er, Gd, Lu, Sm, Y, Tl, Na, Ag, Cu and Mg; and a, b and e respectively show numerical values within ranges of $0 \leqq a < 0.5$, $0 \leqq b < 0.5$ and $0.001 < e \leqq 1.0$.

An experiment by which columnar crystals composed of a stimulable phosphor are formed on a support with a vapor deposition method has also been made (Refer to Patent document 1).

Sharpness of an image obtained from a radiation image conversion panel having such a structure can be enhanced since a stimulating light which enters the inside of columnar crystals from the surface of a stimulable phosphor layer is totally reflected on the side of columnar crystals, and then travels up to the surface of the stimulable phosphor layer, without being diffused.

But, it is known that sharpness is degraded because the stimulating light which enters a space between columnar crystals is scattered and diffused on the side of columnar crystals. In order to avoid this, filling of a filler such as a high light absorbance material or a high light reflectance material in the spacing between columnar crystals has been tried (Refer to Patent document 1).

[Patent document 1] Japanese Patent O.P.I. Publication No. 2003-248097

SUMMARY

There is a method by which a filler dissolved in an appropriate solvent is coated on a stimulable phosphor layer in order to have spacing between columnar crystals be filled with a filler. It was difficult that the filler was penetrated into spacing between columnar crystals in every corner because of narrow spacing between columnar crystals.

It is an object of the present invention to provide an enhanced performance of a stimulable phosphor layer obtained by having spacing between columnar crystals of the stimulable phosphor layer be easily filled with a filler.

DESCRIPTION OF THE PREFERRED EMBODIMENTS

Figure 1:
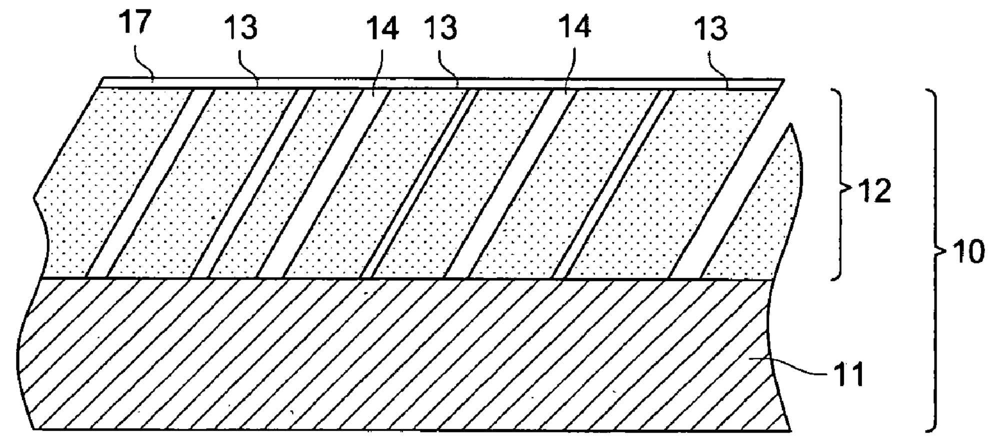
FIG. 1 is a cross-sectional view showing one example of the radiation image conversion panel of the present invention.

The foregoing object can be accomplished by the following constitution.

(Structure 1) A process for manufacturing a radiation image conversion panel having a stimulable phosphor layer in a columnar crystal form prepared by a vapor deposition method, wherein a surface of the foregoing columnar crystal is partly (or preferably totally) coated or sprayed with a surface treatment agent in surface tension not more than 25 mN/m.

In the invention described in Structure 1, entire columnar crystals can be evenly surface-treated by penetrating the surface treatment agent into spacing of columnar crystals and by being treated with the surface treatment agent in surface tension not more than 25 mN/m.

(Structure 2) The process for manufacturing a radiation image conversion panel according to Structure 1, wherein the foregoing surface treatment agent has a refractive index not more than 1.45.

In the invention described in Structure 2, the stimulated luminescence produced from inside columnar crystals of a stimulable phosphor layer is totally reflected on the side of columnar crystals and emitted only from the surface of a stimulable phosphor layer, because a refractive index of the surface treatment agent for the surface treatment of columnar crystals is not more than 1.45.

(Structure 3) The process for manufacturing a radiation image conversion panel according to Structure 1 or 2, wherein the foregoing surface treatment agent contains a fluorine-containing polymer.

In the invention described in Structure 3, functions such as water repelling function, oil-repelling function, moisture-resistant function and antifouling function can be added to the stimulable phosphor layer since the surface treatment agent contains a fluorine-containing polymer.

(Structure 4) The process for manufacturing a radiation image conversion panel according to any one of Structures 1–3, wherein a solvent used for the foregoing surface treatment agent is a fluorine-containing solvent.

In the invention described in Structure 4, a thin and even surface treatment can be conducted since a solvent used for the surface treatment agent is a fluorine-containing solvent.

(Structure 5) The process for manufacturing a radiation image conversion panel according to any one of Structures 1–4, wherein the foregoing surface treatment agent contains colorants which absorb a stimulating light of a stimulable phosphor.

In the invention described in Structure 5, sharpness of an image can be enhanced by absorbing a stimulating light which entered spacing between columnar crystals and preventing the scattering, since colorants which absorb a stimulating light of a stimulable phosphor can be filled in spacing between columnar crystals.

(Structure 6) The process for manufacturing a radiation image conversion panel according to any one of Structures 1–5, wherein at least one layer in the foregoing stimulable phosphor layers contains a stimulable phosphor as expressed in the following formula (1);

$$M^1X.aM^2X'_2.bM^3X''_3:eA \quad (1)$$

where $M^1$ represents at least one alkali metal selected from the group including Li, Na, K, Rb and Cs; $M^2$ represents at least one divalent metal selected from the group including Be, Mg, Ca, Sr, Ba, Zn, Cd, Cu and Ni; $M^3$ represents at least one trivalent metal selected from the group including Sc, Y, La, Ce, Pr, Nd, Pm, Sm, Eu, Gd, Tb, Dy, Ho, Er, Tm, Yb, Lu, Al, Ga and In; each of X, X' and X" represents at least one halogen selected from the group including F, Cl, Br and I; A represents at least one metal selected from the group including Eu, Tb, In, Ga, Cs, Ce, Tm, Dy, Pr, Ho, Nd, Yb, Er, Gd, Lu, Sm, Y, Tl, Na, Ag, Cu and Mg; and a, b and e respectively show numerical values within ranges of $0 \leqq a<0.5$, $0 \leqq b<0.5$ and $0.0001<e \leqq 1.0$.

In the invention described in Structure 6, a radiation image conversion panel with high luminance can be prepared by forming a stimulable phosphor layer composed of a stimulable phosphor as expressed in formula (1).

(Structure 7)

The process for manufacturing a radiation image conversion panel according to any one of Structures 1–6, wherein at least one layer in the foregoing stimulable phosphor layers contains a stimulable phosphor as expressed in the following formula (2);

$$CsBr:eEu \quad (2)$$

where e shows a numerical value within a range of $0.0001<e \leqq 1.0$.

In the invention described in Structure 7, a radiation image conversion panel with higher luminance can be prepared by forming a stimulable phosphor layer composed of a stimulable phosphor as expressed in formula (2).

DETAILED DESCRIPTION OF THE INVENTION

The present invention will be explained further in detail as described below. A radiation image conversion panel in the present invention as shown in FIG. 1 is composed of substrate 11 and stimulable phosphor 12 composed of columnar crystal 13 formed on one surface of substrate 11 by a vapor deposition method. Stimulable phosphor layer 12 is also coated as needed by moisture resistance protective film 17.

There are preferably used, as substrate 11, a variety of glass, polymeric materials and metals having a moisture resistance property. Preferred examples especially include plastic film such as cellulose acetate film, polyethylene terephthalate film, polyethylene naphthalate film, polyamide film, polyimide film, triacetate film and polycarbonate film; plate glass such as quartz, borosilicate glass, chemically tempered glass and crystallized glass; metal sheets such as aluminum sheet, iron sheet and copper sheet, and metal sheet covered with the metallic oxide layer. Substrate 11 may be smooth-surfaced, or it may be matted in order to enhance adhesion of the substrate to the stimulable phosphor layer.

The layer thickness of substrate 11, depending on thickness of substrate 11, is usually 80 to 5000 μm, and preferably 80 to 3000 μm in terms of handling. To enhance adhesion between the substrate and a stimulable phosphor, an underlayer may optionally be provided in advance on the surface of substrate 11 on which stimulable phosphor layer 12 is deposited.

A thickness of stimulable phosphor layer 12 is 50 μm or more and it is preferable that the layer thickness is in the range between 300 and 500 μm. What is expressed in formula (1) can be used as a stimulable phosphor used for stimulable phosphor layer 12.

$$M^1X.aM^2X'_2.bM^3X''_3:eA \quad (1)$$

where $M^1$ represents at least one alkali metal selected from the group including Li, Na, K, Rb and Cs, and it is preferably at least one alkali metal selected from the group including K, Rb and Cs, in particular.

$M^2$ represents at least one divalent metal selected from the group including Be, Mg, Ca, Sr, Ba, Zn, Cd, Cu and Ni, and it is preferably at least one divalent metal selected from the group including Be, Mg, Ca, Sr, and Ba, in particular.

$M^3$ represents at least one trivalent metal selected from the group including Sc, Y, La, Ce, Pr, Nd, Pm, Sm, Eu, Gd, Tb, Dy, Ho, Er, Tm, Yb, Lu, Al, Ga and In, and it is preferably at least one trivalent metal selected from the group including Y, La, Ce, Sm, Eu, Gd, Lu, Al, Ga and In in particular.

Each of X, X' and X" represents at least one halogen selected from the group including F, Cl, Br and I, and X especially represents at least one halogen selected from the group including Br and I preferably.

A represents at least one metal selected from the group including Eu, Tb, In, Ga, Cs, Ce, Tm, Dy, Pr, Ho, Nd, Yb, Er, Gd, Lu, Sm, Y, Tl, Na, Ag, Cu and Mg, and it is preferably at least one metal selected from the group including Eu, Cs, Sm, Tl, and Na, in particular.

The symbols a, b and e show respectively numerical values in the ranges of $0 \leqq a<0.5$, $0 \leqq b<0.5$ and $0<e \leqq 1.0$, and it is especially preferable that b shows a numerical value in the range of $0 \leqq b \leqq 10^{-2}$.

It is preferable that a stimulable phosphor among those, expressed by the following formula (2), is used;

$$CsBr:eEu \quad (2)$$

where e shows a numerical value in the range of $0.0001<e \leqq 1.0$.

The stimulable phosphor mentioned above is manufactured with phosphor materials exemplified below in (a), (b), (c) and (d) by the method described below.

(a) At least one compound or two compounds or more selected from the group including LiF, LiCl, LiBr, LiI, NaF, NaCl, NaBr, NaI, KF, KCl, KBr, KI, RbF, RbCl, RbBr, RbI, CsF, CsCl, CsBr and CsI.

(b) At least one compound or two compounds or more selected from the group including $BeF_2$, $BeCl_2$, $BeBr_2$, $BeI_2$, $MgF_2$, $MgCl_2$, $MgBr_2$, $MgI_2$, $CaF_2$, $CaCl_2$, $CaBr_2$, $CaI_2$, $SrF_2$, $SrCl_2$, $SrBr_2$, $SrI_2$, $BaF_2$, $BaCl_2$, $BaBr_2$, $BaI_2$, $ZnF_2$, $ZnCl_2$, $ZnBr_2$, $ZnI_2$, $CdF_2$, $CdCl_2$, $CdBr_2$, $CdI_2$, $CuF_2$, $CuCl_2$, $CuBr_2$, $CuI_2$, $NiF_2$, $NiCl_2$, $NiBr_2$ and $NiI_2$.

(c) At least one compound or two compounds or more selected from the group including $ScF_3$, $ScCl_3$, $ScBr_3$, $ScI_3$, $YF_3$, $YCl_3$, $YBr_3$, $YI_3$, $LaF_3$, $LaCl_3$, $LaBr_3$, $LaI_3$, $CeF_3$, $CeCl_3$, $CeBr_3$, $CeI_3$, $PrF_3$, $PrCl_3$, $PrBr_3$, $PrI_3$, $NdF_3$, $NdCl_3$, $NdBr_3$, $NdI_3$, $PmF_3$, $PmCl_3$, $PmBr_3$, $PmI_3$, $SmF_3$, $SmCl_3$, $SmBr_3$, $SmI_3$, $EuF_3$, $EuCl_3$, $EuBr_3$, $EuI_3$, $GdF_3$, $GdCl_3$, $GdBr_3$, $GdI_3$, $TbF_3$, $TbCl_3$, $TbBr_3$, $TbI_3$, $DyF_3$, $DyCl_3$, $DyBr_3$, $DyI_3$, $HoF_3$, $HoCl_3$, $HoBr_3$, $HoI_3$, $ErF_3$, $ErCl_3$, $ErBr_3$, $ErI_3$, $TmF_3$, $TmCl_3$, $TmBr_3$, $TmI_3$, $YbF_3$, $YbCl_3$, $YbBr_3$, $YbI_3$, $LuF_3$, $LuCl_3$, $LuBr_3$, $LuI_3$, $AlF_3$, $AlCl_3$, $AlBr_3$, $AlI_3$, $GaF_3$, $GaCl_3$, $GaBr_3$, $GaI_3$, $InF_3$, $InCl_3$, $InBr_3$ and $InI_3$.

(d) At least one metal or two metals or more selected from the group including Eu, Tb, In, Ga, Cs, Ce, Tm, Dy, Pr, Ho, Nd, Yb, Er, Gd, Lu, Sm, Y, Tl, Na, Ag, Cu and Mg.

Phosphor materials, which have been selected from the foregoing (a) to (d) so as to meet the numerical range of a, b. and c represented by formula (1), are weighed and mixed in pure water. In this regard, there may be conducted sufficient mixing using a mortar, ball mill or mixer mill.

Next, a prescribed amount of an acid is added to adjust a pH value of C in the thus solution obtained so as to fall within the range of $0<C<7$, and then any water is vaporized.

Further, the raw material mixture obtained is charged into a heat-resistant vessel such as a silica port, an alumina crucible or a silica crucible and then placed in an electric furnace to be calcined. The calcination temperature is preferably 500 to 1000° C. The calcination time, depending on a charging amount of raw material, calcination temperature and the like, is preferably 0.5 to 6 hrs.

As a calcination atmosphere is employed a weakly reducible atmosphere such as a nitrogen gas atmosphere containing a small amount of hydrogen gas or a carbon dioxide atmosphere containing a small amount of carbon monoxide, a nitrogen gas atmosphere, a neutral atmosphere such as an inert gas atmosphere, or a trace amount of oxygen-introduced weakly oxidizing atmosphere.

After completion of calcination under the foregoing condition, calcined material is taken out of the electric furnace and subjected to pulverization. Thereafter, powdery calcined material may again be charged into a heat resistant vessel and then placed in an electric furnace to be calcined under the foregoing condition to further enhance emission luminance of the stimulable phosphor. When the calcined material is allowed to cool from calcination temperature to room temperature, the intended phosphor can also be obtained when it is taken out of the electric furnace and is allowed to stand in an aerial atmosphere. In this regard, the calcined material may be cooled in the same atmosphere as in the calcination, such as a weakly reducing atmosphere, neutral atmosphere or a weakly oxidizing atmosphere.

Emission luminance of the obtained stimulable phosphor can be further enhanced by moving calcined material from a heating area to a cooling area in an electric furnace and then quenching it in a weakly reducing atmosphere, neutral atmosphere or a weakly oxidizing atmosphere.

Stimulable phosphor layer 12 is formed on one surface of substrate 11 with a vapor deposition method or a coating method by using a stimulable phosphor described above. A vacuum evaporation method, a sputter deposition method, a CVD method, and an ion plating method can be employed as a vapor deposition method.

Vacuum evaporation is conducted in such a manner that after placing substrate 11 in an evaporation apparatus, the inside of the apparatus is evacuated to a vacuum degree of about $1.333\times10^{-4}$ Pa. Subsequently, a stimulable phosphor is placed in the inside of the evaporation apparatus as an evaporation source and then evaporation is conducted with heating by a resistance heating method or an electron-beam method to cause the phosphor to be deposited on the surface of substrate 11 to a desired thickness.

As a result, stimulable phosphor layer 12 containing no binder is formed, provided that the evaporation process described above may be divided into plural times to form stimulable phosphor layer 12.

Alternatively, in this evaporation process, plural stimulable phosphor raw materials as an evaporation source are co-evaporated, employing plural resistance heaters or electron beams, and it is possible to synthesize the intended stimulable phosphor on substrate 11 and to form stimulable phosphor layer 12 simultaneously.

In the formation of stimulable phosphor layer 12 by the vapor deposition process, substrate 11 on which stimulable phosphor layer 12 is to be formed, is preferably heated at a temperature between 50 and 400° C., preferably between 100 and 250° C. from the aspect of phosphor properties, more preferably between 50 and 150° C. in consideration of heat resistance properties of resins when resins are employed for substrate 11, and still more preferably between 50 and 100° C.

Figure 2:
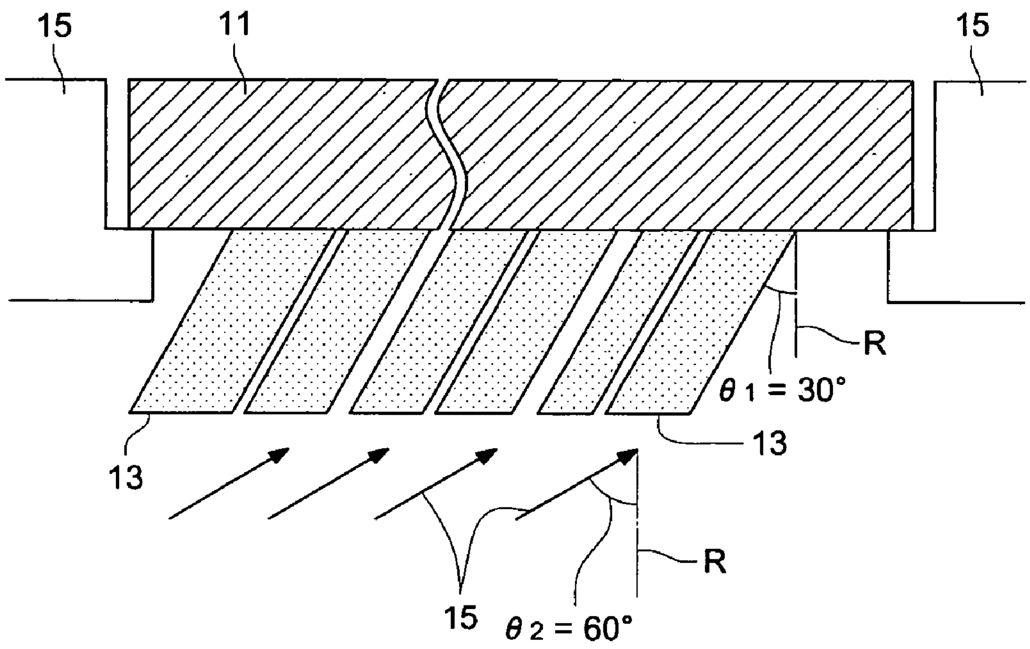
FIG. 2 is a cross-sectional view showing how to form a stimulable phosphor layer prepared for the radiation image conversion panel of the present invention.

FIG. 2 is a diagram showing how stimulable phosphor layer 12 is formed on substrate 11 by the vacuum evaporation method, in which vapor streams 16 of a stimulable phosphor are introduced at an incident angle $\theta_2$ (in the Figure, $\theta_2=60°$) to the line (R) normal to the surface of substrate 11 attached to substrate holder 15 to form columnar crystals 13 on the support, at an angle of $\theta_1$ (in the Figure, $\theta_1=30°$, empirically, about a half of the incident angle $\theta_2$).

The angle of growth on columnar crystals 13 of a stimulable phosphor should be 10 to 70° and is preferably 20 to 55°. The incident angle should be 20 to 80° to make the angle of growth on columnar crystals be 10 to 70° and should also be 40 to 70° to make it be 20 to 55°. When the angle of growth on columnar crystals is large, columnar crystals 13 are tilted excessively in the direction of substrate 11, so that stimulable phosphor layer 12 becomes brittle.

There is a method of placing substrate 11 tilted to an evaporation source in order to supply vapor streams of the stimulable phosphor or the phosphor raw material in the direction of a certain incident angle to substrate 11. There is also another, possible method of placing substrate 11 and an evaporation source to be in parallel with each other and controlling vapor streams in such a way that only an oblique component from the evaporation plane is evaporated onto substrate 11 through a slit.

In those cases, a minimal distance between substrate 11 and an evaporation source, matching a mean flying distance of a stimulable phosphor, is preferably designed to be approximately 10 to 60 cm.

In order to improve a modulation transfer function (MTF) associated with stimulable phosphor layer 12 having columnar crystals 13, a size of columnar crystal 13 is preferably 1 to 50 μm and is more preferably 1 to 30 μm. When columnar crystal 13 is thinner than 1 μm in size, MTF drops because of stimulated emission light scattered by columnar crystal 13 and when columnar crystal 13 is 50 μm or thicker in size, MTF also drops because of decline in the directivity of stimulated emission light.

In addition, the size of columnar crystal 13 is a mean value of diameters obtained by converting cross-sectional areas of each columnar crystal 13 into circles through an observation of the surface of columnar crystal 13 parallel to the plane of substrate 11 and it is calculated, using a micrograph including at least 100 columnar crystals 13 or more in the field of vision.

Spacing 14 in length between columnar crystals 13 is preferably not more than 30 μm and is still more preferably not more than 5 μm. When spacing 14 in length exceeds 30 μm, sensitivity drops since a filling factor of phosphor in stimulable phosphor layer 12 declines.

Since the width of columnar-crystal 13 is influenced by a temperature of substrate 11, a degree of vacuum, an incident angle of a vapor stream, and so forth, a desired width of columnar crystal 13 can be obtained by controlling those factors.

Sputter deposition, as is the case with vacuum deposition, is conducted in such a manner that after setting substrate 11 in a sputtering apparatus, the inside of the apparatus is evacuated to a vacuum level of about $1.333 \times 10^{-4}$ Pa and then inert gas used for sputtering such as Ar or Ne is introduced therein at a gas pressure of about $1.333 \times 10^{-1}$ Pa, subsequently, sputtering is carried out with a target of the stimulable phosphor to cause stimulable phosphor 12 to be deposited on substrate 11 so as to have a desired thickness.

Similarly to the vacuum evaporation, various treatments may be applied in a sputtering process. Further, there are also applicable the CVD method, an ion plating method and others.

The growth rate of stimulable phosphor layer 12 in the vapor deposition method preferably is 0.05 to 300 μm/min. A growth rate of less than 0.05 μm/min results in lowered productivity of the radiation image conversion panel, which is not preferable. In the case of a growth rate of more than 300 μm/min, it is difficult to control the growth rate, which is not suitable.

After stimulable phosphor layer 12 is coated, both stimulable phosphor layer 12 and the substrate material are cut together into a predetermined size. For cutting, any of the common method may be employed. From the viewpoint of workability and accuracy, a cosmetics cutter or a punch machine is preferably employed. When the substrate material is small enough, it may be used as it is for substrate 11, without being cut.

Thickness of stimulable phosphor layer 12 varies, depending on intended characteristics of a radiation image conversion panel, the type of stimulable phosphors, and so forth, but it is preferably selected in the range between 10 and 1000 μm and more preferably in the range between 10 and 500 μm.

After forming a stimulable phosphor layer in the foregoing manner, a surface treatment is conducted. A surface treatment agent in surface tension not more than 25 mN/m can be used for the surface treatment. A surface treatment agent in small surface tension penetrates into spacing 14 between columnar crystals 13 in stimulable phosphor layer 12, and the side surface of columnar crystals 13 can be surface-treated.

It is preferable that a refractive index of the surface treatment agent is smaller than that of a stimulable phosphor and is not more than 1.45. The stimulated luminescence is totally reflected on the side of columnar crystals 13 and emitted from the surface of stimulable phosphor layer 12 by a treatment of the side surface of columnar crystals 13 with a surface treatment agent in low refractive index, so that sharpness can be enhanced.

It is preferable that the above surface treatment agent contains a fluorine-containing polymer. Polymers as fluorine-containing polymers are cited, which are obtained by allowing a perfluoro-ether having two terminal double bonds to singly radical-polymerize or to radical-polymerize with another polymerizable monomer. Such polymers are disclosed, for example, in Japanese Patent O.P.I. Publication Nos. 63-238111 and 63-238115. According to those patent documents, a perfluoro-ether containing two terminal double bonds, e.g., $CF_2{=}CF(CF_2)_n{-}O{-}(CF_2)_mCF{=}CF_2$ (n:0–5, m:0–5, m+n:1–6), is allowed to singly radical-polymerize or a perfluoro-ether containing two terminal double bonds is allowed to radical-copolymerize with another polymerizable monomer to obtain a cyclopolymerized fluorine-containing polymer. For example, radical polymerization of $CF_2{=}CF{-}O{-}CF_2CF{=}CF_2$ forms a fluorine-containing polymer having a cycle structure of the following formula (3) in the main chain.

(3)

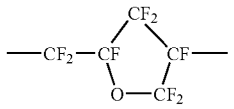

Examples of a monomer co-polymerizable with the perfluoro-ether containing two terminal double bonds include fluoro-olefins such as tetrafluoroethylene, fluoro-vinyl ether such as perfluorovinyl, vinylidene fluoride, vinyl fluoride and chlotriethylene.

As described in Japanese Patent Examined Publication No. 63-18964, a fluorine-containing polymer, for example, is cited, which is comprised of the following monomer. Specifically, there are cited an amorphous copolymer composed of a monomer unit of perfluoro-2,2-dimethyl-1,3-dioxonol (PDD), as shown in formula (4) below and a monomer unit of tetrafluoroethylene, or an amorphous ternary polymer having the foregoing monomer units and another ethylenically unsaturated monomer.

(4)

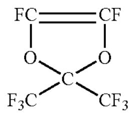

The above copolymer contains preferably a monomer unit of PDD of at least 11.2 mol %. It is not preferred to use it as an anti-reflection agent for optical apparatuses because of occurrence of an optical scattering since it becomes crystallized in the case of a content less than this mol %. For the similar reason, the above ternary polymer contains preferably a monomer unit of PDD of at least 12 mol %. Examples of an ethylenically unsaturated monomer forming a ternary polymer which can be used include olefins such as ethylene and 1-butene, vinyl compounds such as vinyl fluoride and vinylidene fluoride, and perfluoro-compounds such as perfluoropropene.

There are commercially available fluorine-containing polymers such as Cytop CTX-805 and CTX109A (trade name, available from Asahi Glass Co., Ltd.).

A fluorine-containing polymer may contain a copolymer copolymerized with a monomer having an unsaturated silane monomer and an unsaturated ester monomer containing a fluorinated aliphatic group. The unsaturated ester monomer containing a fluorinated aliphatic group is a compound which contains at least a partially fluorinated aliphatic group (preferably at least a partially fluorinated alkyl group) and an ethylenically unsaturated bond which is polymerizable. Specifically, the unsaturated ester monomer containing a fluorinated aliphatic group is represented by the following formula (5);

(5)

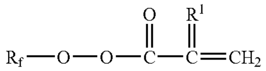

where $R_f$ is straight, branched fluorinated aliphatic group or at least partially fluorinated cyclic aliphatic group having 2 to 12 carbon atoms (for example, at least partially fluorinated alkyl group and preferably completely fluorinated alkyl group); $R^1$ is H or $CH_3$; Q is a lower alkylene group such as —$CH_2$— or —$CH_2CH_2$— or a —$SO_2NR^2$— (lower alkylene group), i.e., —$SO_2NR^2$-attached lower alkylene group, such as —$SO_2NR^2$—$CH_2$— or —$SO_2NR^2$—$CH_2CH_2$—, in which $R^2$ is a hydrogen atom or a lower alkyl group, such as —$CH_3$ or —$C_2H_5$.

Water-repelling, oil-repelling and antifouling properties are improved when $R_f$ is large in carbon number or the number of fluorinated group becomes larger. The carbon number, which is too large, may have harmful effects on human bodies since polymer tends to be accumulated in anatomy. Thus, the $R_f$ is preferably a fluorinated aliphatic group having 3 to 7 carbon atoms and preferably 3 to 6 carbon atoms. It is preferred that highly improved water-repelling, oil-repelling and antifouling properties exhibit in the case of the Rf containing —$CF_3$ group which is totally fluorinated as an end group.

The Q is a lower alkylene group used for keeping water-repelling property of polymer and preferably —$CH_2$— or —$CH_2CH_2$—.

Specific examples of the unsaturated ester monomer include: $F(CF_2)_6CH_2OC(=O)C(CH_3)=CH_2$, $C_7F_{15}SO_2N(C_2H_5)C_2H_4OC(=O)C(CH_3)=CH_2$, $c\text{-}C_6F_{11}CH_2OC(=O)C(CH_3)=CH_2$, $C_6F_{13}C_2H_4OC(=O)CH=CH_2$, $(CF_3)_2CF(CF_2)_2C_2H_4OC(=O)CH=CH_2$, $H(CF_2)_4CH_2OC(=O)CH=CH_2$, $F(CF_2)_4C_2H_4OC(=O)CH=CH_2$, and $F(CF_2)_3CH_2OC(=O)CH=CH_2$.

These monomers can be prepared in accordance with conventional methods, as described in the specifications of U.S. Pat. Nos. 2,803,615 and 2,841,573.

Based on a total weight of unsaturated ester monomer containing a fluorinated aliphatic group and unsaturated silane monomer, 50 wt % or more of unsaturated ester monomer containing a fluorinated aliphatic group is contained and preferably 70 wt % or more. Water-repelling, oil-repelling and antifouling properties can sufficiently be added to coating by this.

An unsaturated silane monomer used for copolymer acts in such a manner that adhesiveness is enhanced to the base material with coating. The unsaturated silane monomer containing a silicon atom is a silane-containing compound which enhances adhesiveness to the base material and also is a polymerizable compound having an ethylenically unsaturated bond. Specifically, the unsaturated silane monomer is represented by the following formula (6);

(6)

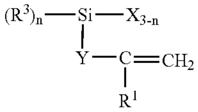

where $R^1$ is H or $CH_3$; $R^3$ is a hydrogen atom or a lower alkyl group such as a methyl group or an ethyl group, X is alkoxy, halogen or RCOO—, R is a hydrogen atom or a lower alkyl group such as a methyl group or an ethyl group, Y is a single bond or —$CH_2$, and n is an integer of 0, 1 or 2.

Specific compounds where X is an alkoxy group include vinyltrialkoxysilane such as $(CH_3O)_3SiCH=CH_2$, $(C_2H_5O)_3SiCH=CH_2$ and allyltrialkoxysilane i.e., $(CH_3O)_3SiCH_2CH=CH_2$. A specific example where X is halogen includes $CH_2=CHSiCl_3$. A specific compound where X is RCOO— includes $(CH_3COO)_3SiCH=CH_2$.

Based on a total weight of unsaturated ester monomer containing a fluorinated aliphatic group and unsaturated silane monomer, 1–50 wt % of unsaturated silane monomer is contained. Adhesiveness is not prominently enhanced to the base material with coating in the range less than 1.0 wt % and water-repelling and oil-repelling properties occasionally drop in the range more than 50 wt %. In consideration of a balance of adhesiveness to the base material with coating and water-repelling property, an amount of unsaturated silane monomer is preferably 1–30 wt %, more preferably 1–10 wt %, and still more preferably 1.5–4 wt %.

Examples of commercially available surface treatment agent which contain the foregoing fluorine-containing polymer and fluorine-containing solvent include Cytop (registered trademark, available from Asahi Glass Co., Ltd.), Fluorinert (trade mark registration, available from Sumitomo 3M Ltd.) such as FC-87, FC-72, FC-84, FC-77, FC-3255, FC-3283, FC-40, FC-43, FC-70, FC-5312, and Novec (registered trademark, available from Sumitomo 3M Ltd.) such as EGC-1700 and so forth.

Colorants which absorb a stimulating light may be contained in the surface treatment agent. Colorants can be penetrated into every corner of spacing 14 between columnar crystals 13 by treating stimulable phosphor layer 12 with a surface treatment agent in small surface tension containing colorants which absorb a stimulating light. Thus, sharpness can be enhanced further by preventing the scattering of a stimulating light which enters spacing 14.

The type of colorants to be employed is determined depending on what kind of phosphor is used. Employed as stimulable phosphors for a radiation image conversion panel are phosphors which result in stimulated luminescence in the wavelength range of 300 to 500 nm, utilizing stimulating light in the wavelength range of 400 to 900 nm. Accordingly, employed as colorants are the blue to green organic or inorganic colorants.

Listed as examples of the blue to green organic colorants are Neozapon Blau 807 (manufactured by BASF AG), Zapon First Blue 3G (manufactured by Hoechst AG), Estrol Brill Blue N-3RL (manufactured by Sumitomo Chemical Co., Ltd.), Sumiacryl Blue N-3RL (manufactured by Sumitomo Chemical Co., Ltd.), D & C Blue No. 1 (manufactured by National Aniline AG), Spirit Blue (manufactured by Hodogaya Kagaku Co., Ltd.), Oil Blue No. 603 (manufactured by Orient Co., Ltd.), Kiton Blue A (manufactured by Ciba-Geigy Co.), Aizen Cathilon Blue GLH (manufactured by Hodogaya Kagaku Co., Ltd.), Lake Blue AFH (Kyowa Sangyo Co., Ltd.), Primocyanine 6GX (manufactured by Inahata Sangyo Co., Ltd.), Brillacid Green 6BH (manufactured by Hodogaya Kagaku Co., Ltd.), Cyanine Blue BNRS (Toyo Ink Co., Ltd.), and Lionol Blue SL (manufactured by Toyo Ink Co., Ltd.). Further, listed as examples of the blue to green inorganic colorants are ultramarine blue, cobalt blue, cerulean blue, chrome oxide, and $TiO_2$—ZnO—CoO—NiO based pigments. However, the present invention is not limited to these examples.

Furthermore, material exhibiting high light absorbance or high light reflectance as a filler may be contained. It is useful in preventing lateral diffusion of stimulated emission light entering stimulable phosphor layer 12 to have spacing 14 between columnar crystals 13 filled with a filler such as high light absorbance material or high light reflectance material.

Solvents suitable for the foregoing surface treatment agent include fluorinated solvents such as hydrofluorocarbon (HFC), hydrofluoroether (HFE) and so forth. Coating can be conducted evenly up to spacing 14 between columner crystals of a stimulable phosphor since HFC and HFE have a low surface tension, compared with other organic solvents. It is preferable that HFC and HFE are liquid at ordinary temperature and normal pressure and are non-flammable.

HFC possesses a main carbon chain having 3 to 8 carbon atoms and preferably a main carbon chain having 4 to 9 carbon atoms. A main carbon chain may be straight, branched, cyclic or a mixture of those. It is also preferable that a fluorine substitution rate of hydrogen atoms in the main carbon chain is about 5 to 95 mol %.

Examples of HFC to be employed include $CF_3CFHCFHCF_2CF_3$, $C_5F_{13}H$, $C_6F_{13}H$, $CF_3CF_2CH_2CH_2F$, $CHF_2CF_2CF_2CHF_2$, 1,2-dihydroperfluorocyclopentane, 1,2-trihydroperfluorocyclopentane, and so forth. Especially, $C_4F_9OCH_3$, $C_4F_9OC_2H_5$, $CHF_2CF_2OCH_2CF_3$ and cyclic $C_5H_3F_7$ can be preferably used.

HFE is composed of carbon, fluorine, hydrogen and one ether oxygen atom or more, and one heteroatom or more incorporated in the main carbon chain such as sulfur or trivalent nitrogen atom may be contained. HFE may be straight, branched, cyclic or a mixture of those which is, for example, alkyl cycloaliphatic. In addition, it is preferable that an unsaturated bond is not contained in HFE.

Compounds which are represented by the following formula (7) can be used for HFE;

$$(R^4—O)_a—R^5 \quad (7)$$

where a is an integer of 1 to 3; $R^4$ and $R^5$ are identical or different with each other and are selected from the group including alkyl, aryl, and alkyl-alkyl group. At least one of $R^4$ and $R^5$ contains at least one fluorine atom, at least one of $R^4$ and $R^5$ contains at least one hydrogen atom, either one of $R^4$ and $R^5$ or both of $R^4$ and $R^5$ may contain one hetero atom or more in the chain, and the total number of fluorine atoms in HFE is preferably at least the total number of hydrogen atoms or more. $R^4$ and $R^5$ may be straight, branched, or cyclic and both $R^4$ and $R^5$ are preferably saturated though one unsaturated bond or more may be contained.

Examples of commercially available HFE having such a property include Novec (registered trademark, available from Sumitomo 3M Ltd.) such as HFE-7100, HFE7200, HFE711PA, HFE-71DE and HFE-71DA.

After a surface treatment was conducted as described above, moisture resistance protective film 17 by which stimulable phosphor layer 12 was coated to be sealed was prepared. Specifically employed as materials for preparing moisture resistance protective film 17 may be resinous films such as cellulose acetate, nitrocellulose, polymethyl methacrylate, polyvinyl butyral, polyvinyl formal, polycarbonate, polyester, polyethylene terephthalate, polyethylene naphthalate, polyethylene, polyvinylidene chloride, nylon, polytetrafluoroethylene, polytrifluoro-ethylene chloride, tetrafluoroethylene-hexafluoropropylene copolymer, vinylidene chloride-vinyl chloride copolymer and vinylidene chloride-acrylonitrile copolymer. A thinner film layer is preferably good for the initial image since there is no problem concerning the film strength even though the film thickness is not more than 100 μm because of easy processing of resinous films.

Those moisture resistance protective films may possess a laminated, inorganic material layer in which both moisture permeability and oxygen permeability are low. Examples of such an inorganic material include $SiO_x$ (SiO, $SiO_2$), $Al_2O_3$, $ZnO_2$, $SnO_2$, SiC and SiN. $Al_2O_3$ and SiOx especially among those examples exhibit high light transmittance as well as high moisture permeability and high oxygen permeability, i.e., it is preferred that a dense film can be formed because there are few cracks and micro pores in the film. $Al_2O_3$ and $SiO_x$ may respectively be laminated independently. Both $Al_2O_3$ and $SiO_x$ may also be laminated together since moisture permeability and oxygen permeability can be enhanced by laminating both $Al_2O_3$ and $SiO_x$.

Methods such as a PVD method, a sputter deposition method, CVD method and PE-CVD (Plasma enhanced CVD) can be used for the lamination of inorganic material to a moisture resistance protective film. The lamination may be conducted both before and after a phosphor layer is coated by a resinous film. It is preferable that thickness of a laminated layer is approximately 0.01 to 1 μm.

A laminate film obtained by laminating a metal film such as an aluminum film and so forth may be used. A commercially available moisture resistance resinous film in which an evaporation layer is preformed in advance may also be used. Examples of such a moisture resistance resinous film include GL-AE (manufactured by Toppan Printing Co., Ltd.) and so forth. Those films can be moisture resistance protective films obtained by laminating a plural number of the foregoing films.

Any sealing method which is known can be used for sealing stimulable phosphor layer 12 with moisture resistance protective films. A moisture resistance protective film which is, for example, a resinous film whose outermost layer is thermally sealed is placed above and below phosphor plate 10, the outer portion rather than the lateral portion of the phosphor plate of a moisture resistance protective film is thermally sealed by an impulse sealer, applying pressure and heating, and stimulable phosphor layer 12 can be sealed by this method.

Examples of the present invention will be explained as described below. However, the present invention is not limited to these examples.

Various types of radiation image conversion panels were manufactured by the method described below.

<Preparation of Substrate>

A light reflective layer was prepared on one surface of a transparent crystallized glass having 500 μm in thickness which was used as a substrate. The light reflective layer was formed on a substrate by evaporating titanium oxide (manufactured by Fruuchi Chemical Corporation) and zirconium oxide (manufactured by Fruuchi Chemical Corporation).

The layer thickness was adjusted to have 85% of the light reflectance at 400 nm in wave length and 20% of the light reflectance at 660 nm in wave length.

<Preparation of Phosphor Plate>

A stimulable phosphor layer was formed on the foregoing substrate by evaporating a stimulable phosphor comprised of CsBr:Eu. The substrate was set in a vacuum chamber of an evaporation apparatus and heated up to 240° C. Next, nitrogen gas was introduced into the vacuum chamber and a degree of vacuum was set to 0.1 Pa. The surface of the substrate on which a light reflective layer was formed was arranged to face the evaporation source. The evaporation source and a substrate were placed to be away from each other by a distance of 60 cm. An aluminum slit was also placed between the evaporation source and the substrate and vapor streams formed by a stimulable phosphor material were arranged to introduce at an incident angle of 30° to the line normal to the surface of the substrate. An evaporation was conducted while the substrate was conveyed in the direction of its surface and a stimulable phosphor layer possessing columnar crystals having 300 μm in thickness was formed on the substrate to obtain a phosphor plate.

EXAMPLE

Example 1

A phosphor plate was immersed in a surface treatment agent solution for two minutes, subsequently pulled out of the solution at speed of 1 cm/sec and dried at temperature of 40° C. for one hour to conduct a surface treatment. Cytop (19 mN/m in surface tension; 1.34 in refractive index; manufactured by Asahi Glass Co., Ltd.) as a fluorinated surface treatment agent solution was employed.

Example 2

This is the same as EXAMPLE 1 except that EGC-1700 (11 mN/m in surface tension; 1.27 in refractive index; manufactured by Sumitomo 3M Ltd.) was employed as a surface treatment agent.

Example 3

EGC-1700 as a surface treatment agent was used and a colorant (Neozapon Blau 807; manufactured by BASF AG) content for a surface treatment agent was adjusted to 0.03 wt %. Items other than the foregoing are the same as those in EXAMPLE 1.

Comparative Example

No surface treatment was conducted.

<Preparation of Moisture Resistance Protective Film>

A moisture resistance protective film to be prepared on the side of a stimulable phosphor layer of a phosphor plate was formed with a dry lamination technique by laminating polyethylene terephthalate (PET 12) having 12 μm in thickness to which various types of matting process were conducted and PET (VMPET12; manufactured by Toray Advanced Film Co., Ltd.) having 12 μm in thickness on which Alumina was evaporated. Two liquid reaction type urethane-containing adhesive was used for the dry lamination.

A moisture resistance protective film prepared on the side of a substrate of a phosphor plate was also formed by coating with a thermal adhesion type lacquer after an aluminum foil having 9 μm in thickness and PET having 100 μm in thickness were laminated with the dry laminate technique.

<Sealing of Phosphor Panel>

The foregoing moisture resistance protective films were placed on both surfaces of a phosphor panel. This was placed inside a vacuum chamber and gas in the vacuum chamber was converted by introducing helium gas after pressure was reduced down to 200 Pa. Pressure in the vacuum chamber was subsequently readjusted to 7000 Pa, moisture-resistant protective films placed above and below at the peripheral area of the phosphor panel adhered thermally under this reduced pressure using an impulse sealer, and a radiation image conversion panel was obtained by sealing the phosphor panel. The impulse sealer having 8 mm in heater width was employed.

<Evaluation of Sharpness>

Each of the radiation image conversion panels was exposed to X-rays at a tube voltage of 80 kVp through a modulation transfer function (MTF) chart made of lead. Thereafter, the exposed panel was stimulated utilizing a He—Ne laser beam (having 633 nm in wavelength). Stimulated luminescence radiated from the phosphor layer was received by a light receiving device (a photomultiplier with spectral sensitivity S-5) and converted into electric signals, which were subjected to analog/digital conversion. Converted signals were recorded on a hard disk, and the MTF of X-ray image recorded on the hard disk was examined by analyzing the record with a computer. MTF values (%) which were determined at a space frequency of 1 cycle/mm are shown below in Table 1, wherein the higher the MTF value is, the better the sharpness is.

<Evaluation of Contrast>

A lead disk having 40 mm in thickness was captured on a radiation image conversion panel and the radiation image conversion panel was subsequently exposed to X-rays at a tube voltage of 80 kVp. Thereafter, a stimulable phosphor layer was stimulated by scanning the radiation image conversion panel from the side of the stimulable phosphor layer utilizing a semiconductor laser (660 nm) and images were read out by receiving stimulated luminescence with a light receiving device (a photomultiplier with spectral sensitivity S-5). Images obtained were output by a laser writing film printer. The output images were visually observed to evaluate them in five-grade evaluation, based on contrast obtained from a lead disk area (white) and a lead disk peripheral area (black) as described below. Incidentally, images which resulted in the evaluation below grade 3 were judged to be unsuitable for diagnoses.

5: A lead disk peripheral area and a black-and-white brightness difference can be observed clearly.

4: Though a lead disk peripheral area is slightly blurred, a black-and-white brightness difference can substantially be observed clearly.

3: A lead disk peripheral area is blurred and a black-and-white brightness difference is slightly indistinct.

2: A lead disk peripheral area and a black-and-white brightness difference can not be observed clearly, and a lead disk size is not reproduced, either.

1: A lead disk peripheral area and a black-and-white brightness difference can not be observed clearly, and a degree of whiteness is low at the center area.

Evaluation results are shown in Table 1.

TABLE 1

| | Surface treatment agent | Colorant | MTF | Contrast |
|---|---|---|---|---|
| Comparative Example | None | None | 0.71 | 3 |
| Example 1 | Cytop | None | 0.77 | 4 |
| Example 2 | EGC-1700 | None | 0.81 | 4 |
| Example 3 | EGC-1700 | 0.03 wt % | 0.86 | 5 |

A radiation image conversion panel in Example 1: Sharpness was 0.77 and a black-and-white brightness difference was substantially observed clearly.

A radiation image conversion panel in Example 2: Sharpness was 0.81 and a black-and-white brightness difference was mostly observed clearly.

A radiation image conversion panel in Example 3: Sharpness was 0.86 and a black-and-white brightness difference was observed clearly.

A radiation image conversion panel in Comparative Example: Sharpness was 0.71 and a black-and-white brightness difference was slightly indistinct.

In the present invention, entire columnar crystals were able to be evenly surface-treated by penetrating the surface treatment agent into spacing of columnar crystals and by being treated with the surface treatment agent in surface tension not more than 25 mN/m as shown in the above results.

It was possible to enhance sharpness of a radiation image conversion panel by treating with the surface treatment agent in refractive index not more than 1.45. Sharpness of a radiation image conversion panel was further enhanced by adding colorants which absorb a stimulating light in the surface treatment agent.

EFFECTS OF THE INVENTION

In the invention described in Structure 1, entire columnar crystals can be evenly surface-treated by penetrating the surface treatment agent into spacing of columnar crystals and by being treated with the surface treatment agent in surface tension not more than 25 mN/m.

In the invention described in Structure 2, the stimulated luminescence produced from inside columnar crystals of a stimulable phosphor layer is totally reflected on the side of columnar crystals and emitted only from the surface of a stimulable phosphor layer, because a refractive index of the surface treatment agent for the surface treatment of columnar crystals is not more than 1.45.

In the invention described in Structure 3, functions such as water repelling function, oil-repelling function, moisture-resistant function and antifouling function can be added to the stimulable phosphor layer since the surface treatment agent contains a fluorine-containing polymer.

In the invention described in Structure 4, a thin and even surface treatment can be conducted since a solvent used for the surface treatment agent is a fluorine-containing solvent.

In the invention described in Structure 5, sharpness of an image can be enhanced by absorbing a stimulating light which entered spacing between columnar crystals and preventing the scattering, since colorants which absorb a stimulating light of a stimulable phosphor can be filled in spacing between columnar crystals.

In the invention described in Structure 6, a radiation image conversion panel with high luminance can be prepared by forming a stimulable phosphor layer composed of a stimulable phosphor as expressed in formula (1).

In the invention described in Structure 7, a radiation image conversion panel with higher luminance can be prepared by forming a stimulable phosphor layer composed of a stimulable phosphor as expressed in formula (2).

What is claimed is:

1. A process for manufacturing a radiation image conversion panel comprising a stimulable phosphor layer in a columnar crystal form prepared by a vapor deposition method, wherein a surface of the foregoing columnar crystal is treated with a surface treatment agent having a surface tension of not more than 25 mN/m.

2. The process for manufacturing a radiation image conversion panel of claim 1, wherein the foregoing surface treatment agent has a refractive index not more than 1.45.

3. The process for manufacturing a radiation image conversion panel of claim 1, wherein the foregoing surface treatment agent contains a fluorine-containing polymer.

4. The process for manufacturing a radiation image conversion panel of claim 1, wherein a solver used for the foregoing surface treatment agent is a fluorine-containing solvent which is $C_4F_9OCH_3$, $C_4F_9OC_2H_5$, $CHF_2CF_2OCH_2CF_3$, or cyclic $C_5H_3F_7$.

5. The process for manufacturing a radiation image conversion panel of claim 1, wherein the foregoing surface treatment agent contains colorants which absorb a stimulating light of a stimulable phosphor.

6. The process for manufacturing a radiation image conversion panel of claim 1, wherein at least one layer in the foregoing stimulable phosphor layers contains a stimulable phosphor as expressed in the following formula (1);

$$M^1X.aM^2X'_2.bM^3X''_3:eA \qquad (1)$$

where $M^1$ represents at least one alkali metal selected from the group consisting of Li, Na, K, Rb, and Cs; $M^2$ represents at least one divalent metal selected from the group consisting of Be, Mg, Ca, Sr, Ba, Zn, Cd, Cu and Ni; $M^3$ represents at least one trivalent metal selected from the group consisting of Sc, Y, La, Ce, Pr, Nd, Pm, Sm, Eu, Gd, Tb, Dy, Ho, Er, Tm, Yb, Lu, Al, Ga and In; each of X, X', and X" represents at least on halogen selected from the group consisting of F, Cl, Br and I; A represents at least one metal selected from the group consisting of Eu, Tb, IN, Ga, Cs, Ce, Tm, Dy, Pr, Ho, Nd, Yb, Er, Gd, Lu, Sm, Y, TI, Na, Ag, Cu, and Mg; and a, b and e respectively show numerical values within ranges of $0 \leqq a < 0.5$, $0 \leqq b < 0.5$ and $0 \leqq e \leqq 1.0$.

7. The process for manufacturing a radiation image conversion panel of claim 1, wherein at least one layer in the foregoing stimulable phosphor layers contains a stimulable phosphor as expressed in the following formula (2);

$$CSBr:eEu \qquad (2)$$

where e shows a numerical value within a range of $0.0001 < e \leqq 1.0$.

* * * * *